Nov. 3, 1964 W. E. TIBBETTS 3,155,949

TUNNEL ERASE MAGNETIC TRANSDUCER

Filed Nov. 24, 1961

INVENTOR.
WILBUR E. TIBBETTS

BY Robert B Leach

ATTORNEY

United States Patent Office 3,155,949
Patented Nov. 3, 1964

3,155,949

TUNNEL ERASE MAGNETIC TRANSDUCER

Wilbur E. Tibbetts, San Jose, Calif., assignor to International Business Machines Corporation, New York, N.Y., a corporation of New York Filed Nov. 24, 1961, Ser. No. 154,794
5 Claims. (Cl. 340—174.1)

The present invention relates to a magnetic transducer assembly and more particularly to a transducer assembly for use with a magnetic storage medium which includes closely adjacent information tracks.

An aim of present day magnetic information storage systems is to store the maximum amount of information in the minimum area of space while maintaining it readily accessible in the minimum amount of time. This requirement has led to the development of various types of information storage systems in which the information is recorded magnetically in generally parallel lines or information tracks. Maximum utilization of available storage area has been hampered, particularly in the case of storage systems which employ one transducer to process information in a number of tracks, by the inability of maintaining exact mechanical alignment of the transducer in relation to the storage medium. It has been found that it is not always possible to reposition a transducer to exactly the same location every time. Since the accessing of the transducer from track to track has been done mechanically, a certain amount of inaccuracy is inherent in the access mechanism due to mechanical tolerances and slack. As a consequence, when the transducer is repositioned to read a previously recorded track it may not be centered directly over the recorded information, but instead a portion of the transducer may be displaced laterally to extend over a portion of an adjacent track. As higher and higher track densities are sought this problem becomes more acute, since the narrower the spacing of adjacent tracks the greater the possibility that the transducer may be positioned over a portion of an unwanted track. The result of this imprecise positioning is that unwanted signals are induced in the sense windings of the transducer, thus complicating the process of accurately reading the recorded information.

The prior known attempts to overcome the problems engendered by high track densities and mechanical access mechanisms have been mainly directed at the development of magnetic recording techniques which accommodate slight inaccuracies in positioning without incurring unwanted signals or noise. Examples of such techniques are write wide, read narrow; write narrow, read wide; and the conventional erase wide, read/write narrow. Each of these techniques requires some means of obliterating, either by writing over or by erasing, previously recorded information. This is to insure that subsequently recorded information does not include a fringe of the previous information that can be picked up as noise during the read operation. In the first technique (write wide, read narrow) and in the second technique (write narrow, read wide) two selection matrices are required for each transducer assembly, and both techniques are difficult to carry out, since the read gap must be precisely aligned with the write gap. With modern magnetic recording elements this alignment is difficult and expensive to fabricate because of the very small gap size, approximately .25" x .020", employed in such elements. With the third technique (erase wide, read/write narrow) any positioning errors produce variations in the amplitude of the read signal and the track densities obtained are lower than with other techniques.

The object of the present invention is to provide a simple and inexpensive magnetic transducer assembly for processing information in generally parallel tracks and which permits an increase in the maximum track density over that heretofore obtained.

The above object is carried out by the present invention without the shortcomings of the prior art devices by provision of a magnetic transducer assembly which includes a read/write element and means for erasing the lateral edges of a written track. The read/write element is provided with a single wide gap which is used for both reading and writing. An erase element, having a gap of equal width to that of the read/write element, is located in the transducer assembly immediately downstream of the read/write element. The erase element is provided with a centrally located tunnel or notch whose width is equal to the desired width of the information track. The erase element is activated during the write operation to erase both lateral edges of the written information, producing an effective narrow write operation. On readback the full width of the effectively recorded track is always spanned by the read element, resulting in a constant amplitude read signal.

The foregoing and other objects, features and advantages of the invention will be apparent from the following more particular description of preferred embodiments of the invention, as illustrated in the accompanying drawings.

Figures 1, 2, 3:
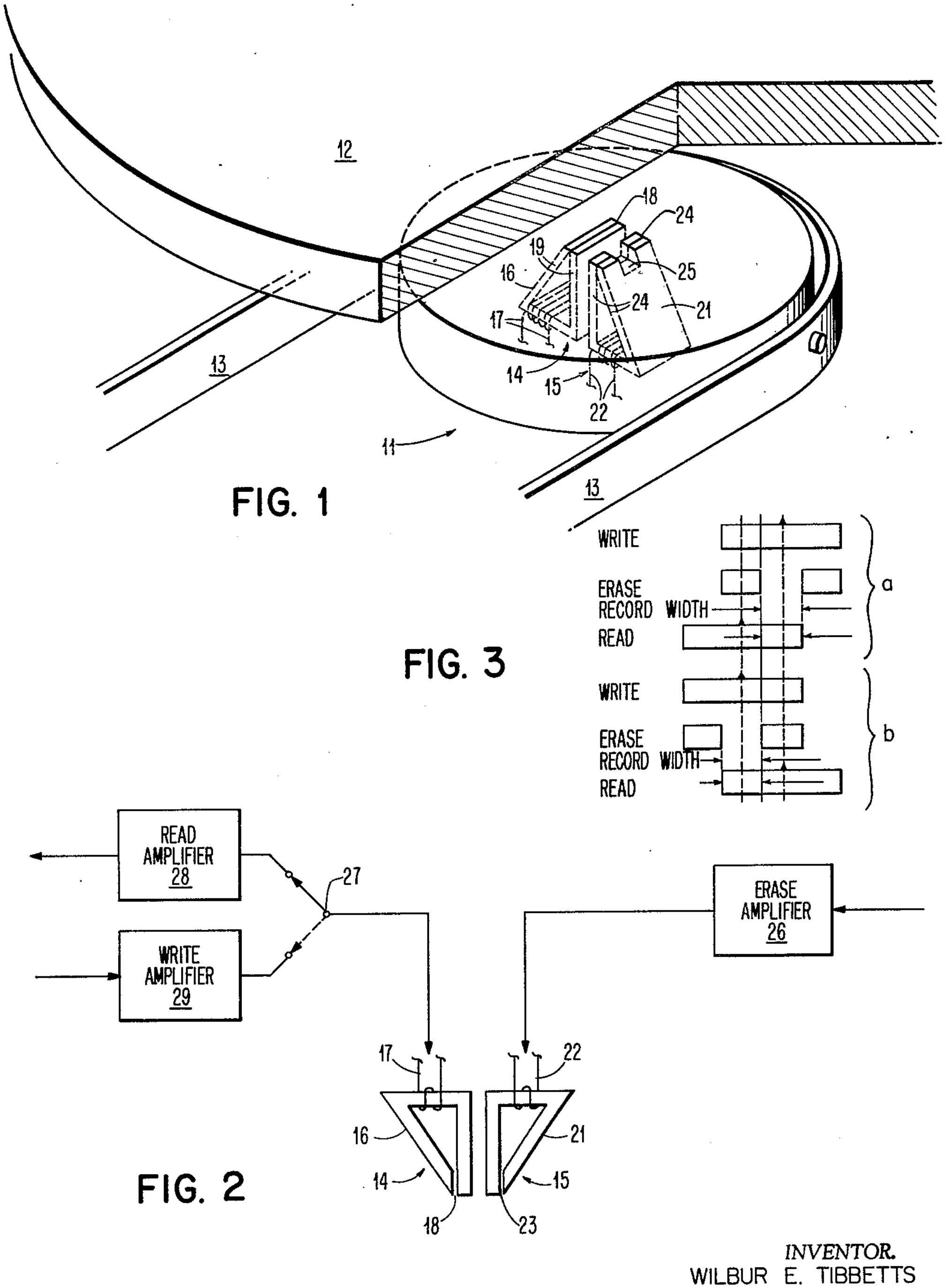
FIG. 1 is a perspective view of one embodiment of the magnetic transducer assembly of the present invention supported adjacent a moving record medium.
FIG. 2 is a block diagram of circuitry associated with the magnetic transducer assembly of FIG. 1.
FIG. 3 is a diagrammatic view illustrating the manner of operation of the present invention.

Referring now to FIG. 1 of the drawing, a transducer assembly 11 is illustrated as supported adjacent a recording medium such as a disk 12 by means of a movable access arm 13. The transducer assembly includes two magnetic elements, i.e., a read/write element 14 and an erase element 15, which are aligned with each other, the erase element being downstream from the read/write element with reference to the direction of movement of the recording medium. The read/write element includes a core 16 which is linked by a suitable read/write winding 17 and is provided with a high reluctance gap 18 defined by pole tips 19. The erase element 15 similarly includes a core 21 which is linked by a suitable erase winding 22 and is provided with a high reluctance gap 23 defined by pole tips 24. The read/write gap 18 and the erase gap 23 are of equal overall width, but the erase gap is interrupted by a tunnel or notch 25 formed in the pole tips 24. The tunnel 25 is centrally located in the pole tips and is equal in width to the desired width of the recorded information track.

Circuitry for controlling the operation of the transducer assembly 11 is illustrated in functional block form in FIG. 2, since the details of such circuitry perform no part of the present invention. The erase winding 22 which links core member 21 is connected to the output of a suitable erase amplifier 26. The read/write winding 17 is connected through a suitable switching arrangement 27 to a read amplifier 28 or to a write amplifier 29.

The method of operation of the present invention is illustrated in connection with FIG. 3. During the write operation, switching arrangement 27 is positioned to connect the read/write winding 17 to the output of the write amplifier 29. The write amplifier varies the current in winding 17 in accordance with a write signal which is representative of the information to be recorded. The information in accordance with the write signal is written wide by the full width of the gap 18. During the write operation a continuous current is supplied to the erase element 15 to erase both lateral edges of the written track. The central portion of the written track is not erased, due to the tunnel 25, and it forms the recorded information track. During the read operation the switching arrangement 27 is positioned to connect the read/write winding 17 with the input of the read amplifier 28 and the erase winding 22 is deenergized. The information signals corresponding to the previously recorded information are conducted from the read/write winding to the read amplifier for amplification and use as may be desired. The width of the recorded information track is considerably less than the width of the read/write gap 18 to effectively produce a write narrow, read wide operation. Since the read/write gap spans a greater width than that of the recorded information track, a constant read signal amplitude is obtained over a range of lateral displacement of the transducer assembly. FIG. 3 is illustrative of problems involved in repositioning a transducer and the method of operation of the present invention. In part *a* of FIG. 3 the information track is recorded at maximum +tolerance and read back at maximum −tolerance, while in part *b* of FIG. 3, the information track is recorded at the maximum −tolerance and read back at maximum +tolerance. By way of example, the mechanical tolerances are assumed to be ±.005 inch and the record width .010 inch. The track spacing is equal to 2 (total mechanical tolerances)+the record width, which results in $$2(.010)+.010=.030 \text{ inch}$$

The width of the read/write gap is equal to the track spacing or .030 inch, and the width of the tunnel 25 is equal to the width of the information track or .010 inch. The dimensional advantages of the present invention over the conventional erase wide, read/write narrow technique are pointed up by the fact that the track spacing for the latter technique is equal to 3 (total mechanical tolerances)+the minimum read width. Using the example illustrated in FIG. 3, this results in a 33⅓ percent increase in track density. Since in the present invention a single read/write gap is used, the problem of precise alignment of the read gap and the write gap is completely avoided. Furthermore, with the transducer assembly of the present invention a single selection matrix is needed to control the read/write element.

While the read/write element has been illustrated in connection with a single read/write winding, separate read and write windings may be provided if desired.

While the invention has been particularly shown and described with reference to a preferred embodiment thereof, it will be understood by those skilled in the art that the foregoing and other changes in the form and details may be made therein without departing from the spirit and scope of the invention.

What I claim is:

1. A magnetic transducer assembly for cooperating with a track on a moving magnetic record medium, comprising:
a read/write element having a relatively wide gap; and
an erase element having an interrupted gap of approximately the same overall width as the read/write gap positioned immediately downstream thereof and fixed in alignment therewith.

2. A magnetic transducer assembly for cooperating with a track on a moving magnetic record medium, comprising:
a read/write element having a relatively wide gap; and
an erase element having a gap of approximately equal overall width to that of the read/write gap, the erase gap being interrupted by a centrally disposed tunnel, the erase element being disposed immediately downstream of and fixed in alignment with the read/write element.

3. A magnetic transducer assembly for cooperating with a moving magnetic record medium, comprising:
read/write means for writing a path of information on the record medium; and
erase means disposed immediately downstream of and fixed in alignment with the read/write means for erasing both edges of the path to leave a recorded information track which is narrower than the read/write means.

4. A magnetic transducer assembly for cooperating with a moving record medium, comprising:
a read/write element having a relatively wide gap for writing a wide path of information on the record medium; and
an erase element positioned immediately downstream of and fixed in alignment with the read/write element, the erase element having an interrupted gap of approximately equal overall width to that of a read/write element to erase both edges of the wide path and leave a recorded information track which is narrower than the read/write element.

5. A magnetic transducer assembly as set forth in claim 4, wherein the gap of the erase element is interrupted by a tunnel which is centrally located relative to the width of both the erase gap and the read/write gap.

References Cited in the file of this patent

UNITED STATES PATENTS

| | | |
|---|---|---|
| 2,092,024 | Rowe | Sept. 7, 1937 |
| 2,538,892 | Begun | Jan. 23, 1951 |
| 2,610,257 | Wissmann | Sept. 9, 1952 |
| 2,987,582 | Naiman | June 6, 1961 |

Disclaimer 3,155,949.—*Wilbur E. Tibbetts*, San Jose, Calif. TUNNEL ERASE MAGNETIC TRANSDUCER. Patent dated Nov. 3, 1964. Disclaimer filed Aug. 30, 1972, by the assignee, *International Business Machines Corporation*.

Hereby enters this disclaimer to claim 3 of said patent.

[*Official Gazette January 16, 1973.*]